(12) United States Patent  
Jetha et al.

(10) Patent No.: US 7,966,575 B1  
(45) Date of Patent: Jun. 21, 2011

(54) MENU DISPLAY FOR A GRAPHICAL USER INTERFACE

(75) Inventors: Zeenat Jetha, Vancouver (CA); Johannes A. Jansen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1843 days.

(21) Appl. No.: 09/649,677

(22) Filed: Aug. 28, 2000

(30) Foreign Application Priority Data

Aug. 28, 1999 (GB) .................................. 9920327.5

(51) Int. Cl.
  *G06F 3/048* (2006.01)
(52) U.S. Cl. ......... 715/817; 715/775; 715/777; 715/825
(58) Field of Classification Search .......... 715/775–788, 715/806–808, 825, 828, 841–847; 345/775–788, 345/794, 803, 806–808, 810, 820, 825, 828, 345/829, 834, 835, 839, 841–847, 850
  See application file for complete search history.

(56) References Cited

U.S. PATENT DOCUMENTS

| 5,463,725 | A | * | 10/1995 | Henckel et al. ............... | 345/776 |
| 5,485,197 | A | * | 1/1996 | Hoarty ............................. | 725/37 |
| 5,621,906 | A | * | 4/1997 | O'Neill et al. ................. | 345/848 |
| 5,664,128 | A | * | 9/1997 | Bauer ............................. | 345/708 |
| 5,682,511 | A | * | 10/1997 | Sposato et al. ................. | 715/716 |
| 5,724,492 | A | * | 3/1998 | Matthews et al. ............. | 345/419 |
| 5,828,360 | A | * | 10/1998 | Anderson et al. ............. | 345/834 |
| 5,940,076 | A | * | 8/1999 | Sommers et al. ............. | 345/834 |
| 6,407,757 | B1 | * | 6/2002 | Ho ................................. | 715/776 |
| 6,538,635 | B1 | * | 3/2003 | Ringot .......................... | 345/156 |
| 6,549,219 | B2 | * | 4/2003 | Selker .......................... | 345/834 |
| 6,556,222 | B1 | * | 4/2003 | Narayanaswami .......... | 345/786 |
| 6,577,330 | B1 | * | 6/2003 | Tsuda et al. .................. | 345/782 |
| 6,678,891 | B1 | * | 1/2004 | Wilcox et al. ................ | 725/42 |

FOREIGN PATENT DOCUMENTS

| EP | 0498082 A1 | 8/1992 |
| EP | 0944218 A1 | 9/1999 |
| WO | 9828912 | 7/1998 |

* cited by examiner

*Primary Examiner* — Simon Ke

(57) ABSTRACT

Methods of providing a menu display 1 for a GUI 31 are disclosed together with a computer program, a computer-readable storage medium 34 and apparatus 31 for the same. Methods include the steps of displaying a menu 1 in the form of a group of icons 3, 20, 21 wherein each icon corresponds to a menu option and is selectable by a user, and displaying an icon selector graphic 4 adapted to identify the icon 20 corresponding to a menu option currently selected by a user. A textual label 19 or a submenu 6-11 corresponding to the currently selected menu option/icon 20 may be displayed. Also, the group of icons and the icon selector graphic may be rotatable relative to each other and where the icon selector graphic is stationary and the group of icons rotatable, the center of rotation of the group of icons may be located outside the periphery of a display. Further disclosed is a rotatable menu window 5.

28 Claims, 3 Drawing Sheets

MENU DISPLAY FOR A GRAPHICAL USER INTERFACE

BACKGROUND OF THE INVENTION

This invention relates to a method of providing a menu display for a graphical user interface (GUI) and to a computer program, a computer-readable storage medium and apparatus for the same.

As is well known, GUIs are used in many interactive applications in which a user is required on occasion to select one of a series of user selectable options. Such GUIs can be found in computer systems, televisions, automatic teller machines, games consoles and the like.

Complex interactive applications, say requiring multiple menu structures, mean that the corresponding GUI must be simple, efficient and flexible if the user is to be able to use such an application quickly and efficiently. This may be achieved to some extent by providing a menu display which is firstly suitable for interfacing with a simple, ergonomic input device and secondly by providing a menu display which is intuitive in its operation.

Known input devices such as mouses, trackballs, keyboards, remote control keypads and touch sensitive screens each have physical attributes which make them either more or less preferable to use with particular menu displays, and indeed vice versa. For example, in our European patent application EP 0498082 A1, a curved band of selectable icons associated with menu options is provided to correspond to the natural hand-movement of a user using a hand-held pointer interface.

With respect to intuitiveness, for the operation of a menu system to be intuitive, it should be capable of operating in a manner which lends itself to the vagaries of human behaviour and anticipation. Although perhaps less quantifiable than physiological factors, intuitiveness is nevertheless important, and perhaps more so in a menu display used only infrequently.

It is therefore an aim of the invention to provide a menu display for a GUI which is capable of being operated quickly and efficiently.

SUMMARY OF THE INVENTION

According to a first aspect of the present invention, a method of providing a menu display for a GUI comprises the steps of displaying a menu in the form of a group of icons wherein each icon corresponds to a menu option and is selectable by a user; displaying an icon selector graphic adapted to identify the icon corresponding to a menu option currently selected by a user; and displaying a textual label corresponding to the currently selected menu option wherein the group of icons and the icon selector graphic are rotatable relative to each other and in accordance with a user's input.

A menu display provided by a method according to the first aspect of the present invention is intuitive and suitable for interfacing with simple, ergonomic input apparatus. In addition, the textual labels provide a explicit reminder of the nature of a menu option having been selected using a non-explicit icon.

In a preferred method according to the first aspect of the present invention, the textual label corresponding to the currently selected option is one of a group of individual textual labels, each describing a different menu option.

In such a preferred method, the group of textual labels is ideally rotatable and, in particular, by appending the textual labels to a rotatable textual label carrier. During a user's change of selection of menu option, this enables the new textual label to be rotated into position in parallel with the rotation of the group of icons relative to the icon selector graphic. To further facilitate a smooth transition of textual labels during a user's change of menu option, the group of textual labels is preferably arranged in a curved fashion, for example, in a circle.

In order to provide a compact display, it is preferable that the centre of rotation of the textual labels is located outside the periphery of the display so that textual labels not in use are rotated off-screen. Also, in order to emphasise the textual label corresponding to the currently selected menu option, it is preferable that only one full text label is in view at any one time.

In accordance with the first aspect of the present invention, the group of icons and the icon selector graphic are rotatable relative to each other. Where the icon selector graphic is stationary and the group of icons is rotatable, the group of icons may be appended to a rotatable carrier. As with the textual labels above, in order to provide a compact display, the centre of rotation of the group of icons may be located outside the periphery of the display and at least one currently unselected icon may be out of view at any given time.

Again similarly to the group of textual labels, the group of icons may be arranged in a curved fashion such as a circle to enable a smooth transition during selection of a new icon/menu option.

According to a second aspect of the present invention, a method of providing a menu display for a GUI comprises the steps of displaying a primary menu in the form of a group of icons wherein each icon corresponds to a primary menu option and is selectable by a user; displaying an icon selector graphic adapted to identify the icon corresponding to a primary menu option currently selected by a user; displaying a submenu associated with the primary menu option current selected by the user; and, in the event of a new primary menu option being selected, displaying a new submenu associated with the new primary menu option, wherein the group of icons and the icon selector graphic are rotatable relative to each other in the plane of the menu display, and in accordance with a user's input. Such a menu display is intuitive and suitable for interfacing with simple, ergonomic input apparatus.

In a preferred embodiment according to the second aspect of the present invention, the submenu options are located on a rotatable window such that in the event of a new primary menu option being selected, the window is rotated, ideally rotated 180° or a multiple thereof, whereby the new submenu is revealed to be on the flip-side of the window. This enables a smooth transition between submenus which is both intuitive and relaxing to the eye.

In order to select a primary menu option, a user may, in a first mode of operation, rotate the group of icons relative to the icon selector graphic in either direction using first selection means and, in a second mode of operation, select a submenu option using the same first selection means in the same fashion. Switching between first and second modes of operation may be accomplished by a user using second selection means.

For example, in the first mode of operation, up and down cursor keys may be used to rotate the icon group in anti-clockwise and clockwise respectively, and in the second mode of operation, the up and down cursor keys may be used to scroll up and down through the submenu options. The switching between first and second modes of operation may be accomplished using left and right cursor keys, or a single toggle key. In addition to keys on a key pad, rocker switches, buttons and many other conventional input means would also be suitable as would be apparent to one of ordinary skill in the art.

With regard to the configuration of the group of icons and the icon selector graphic, the configurations as described above with respect to a method according to the first aspect of the present invention apply equally to a method according to a second of the present invention.

According to a third aspect of the present invention, a method of providing a menu display for a GUI comprises the steps of displaying a menu in the form of a group of icons, each icon corresponding to a menu option selectable by a user; and displaying a textual label corresponding to the currently selected menu option, wherein the textual label corresponding to the currently selected options is one of a rotatable group of textual labels, each textual label corresponding to a different menu option.

The group of textual labels may be appended to a rotatable textual label carrier and, for the reasons mentioned above, it is desirable that the centre of rotation of the textual labels is located outside the periphery of the display; that the group of textual labels is arranged in a curved fashion such as a circle; and that only one full text label is in view at any one time.

According to a fourth aspect of the present invention, a method of providing a menu display for a GUI comprises the steps of displaying a menu in the form of a group of icons wherein each icon corresponds to a menu option and is selectable by a user; and displaying an icon selector graphic adapted to identify the icon corresponding to a menu option currently selected by a user, wherein the icon selector graphic is stationary and the group of icons is rotatable relative to the icon selector graphic in accordance with a user's input; and wherein the centre of rotation of the group of icons is located outside the periphery of a display.

The group of icons may be appended to a rotatable carrier and at least one currently unselected icon may be out of view at any given time.

According to a fifth aspect of the present invention, a method of providing a menu display for a GUI comprises the steps of displaying a first menu in a rotatable window; and, in the event of a second menu being selected by a user, displaying the second menu in place of the first menu by rotating the window, ideally rotated 180° or a multiple thereof, to reveal the second menu on the flip-side of the window.

Also, during rotation, the illusion of perspective may be produced by shrinking the part of the window and its contents perceived to be behind the display and enlarging the part of the window and its contents perceived to be in front of the display wherein both the degree of shrinking and enlargement is related to the perceived distance of the part of the window and its contents from the display.

BRIEF DESCRIPTION OF THE DRAWINGS

Embodiments of the present invention will now be described, by way of example only, with reference to the accompanying figures in which.

DETAILED DESCRIPTION OF THE PREFERRED EMBODIMENTS

Figure 1:
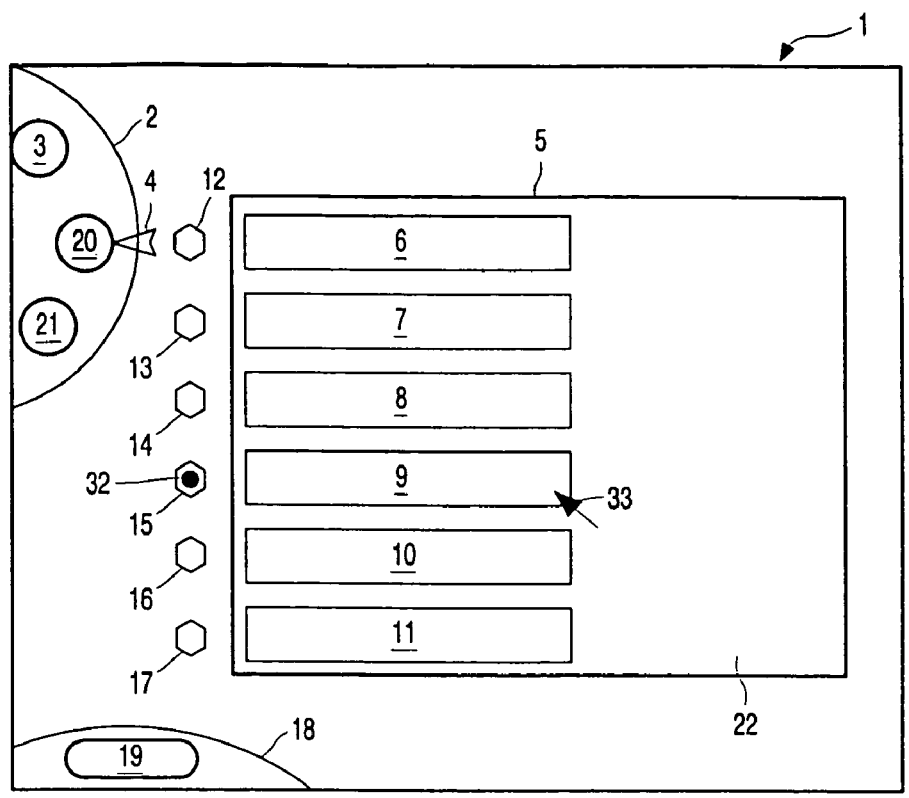
FIGS. 1 to 4 show a menu display for a GUI provided by a method in accordance with the present invention.

In FIG. 1, a menu display 1 is shown comprising a primary menu in the form of a rotatable icon wheel 2 positioned, partially in view, in the top left corner of the menu display. Seven icons corresponding to primary menu options are appended to the icon wheel, three being in view 3, 20, 21 with the remainder of the icons and the icon wheel being "located" off screen. A currently selected icon 20/primary menu option is indicated by reference to an icon selector graphic 4 located adjacent to the icon wheel. In order to select a different icon/primary menu option, a user may rotate the icon wheel either clockwise or anticlockwise by pressing appropriate keys on a keypad (not shown). Alternatively a trackball (not shown) or a mouse with a wheel selector (not shown) may be used to rotate the icon wheel by rotating the trackball or wheel accordingly.

The menu display 1 further comprises a rotatable feedback wheel 18 positioned in the bottom left corner of the menu display, again only partially in view. Seven text labels corresponding to the icons/primary menu options are appended to the feedback wheel with only full text label 19 in view at any one time. Similar to the icon wheel 2, the remainder of the text labels and the feedback wheel are "located" off screen. The feedback wheel rotates in parallel with the icon wheel whereby the text label in view describes the currently selected icon 20/primary menu option. For example, a "web" text label may be displayed when an icon depicting a networked computer is selected corresponding to a menu option to use the internet.

The menu display 1 further comprises a window 22 surrounded by a frame 5. In the window, a submenu is provided consisting of a group of text labels 6-11, each corresponding to a submenu option. The submenu options may include gateways to further submenus, links to user documents or external websites, or system controls such as volume up/down etc. Outside the window, 6 buttons 12-17 are located, each corresponding to an adjacent text label/submenu option. The submenu options may be selected in a variety of conventional ways; for example, by a user using a mouse (not shown) to position a display cursor 33 over a button or text label and clicking to select; or alternatively, by a user pressing appropriate keys on a keypad (not shown) to position an identifier 32 on the button 15 associated with the required submenu option, and then pressing a further key (not shown) to confirm the selection.

The submenu options associated with the text labels 6-11 in the window 22 are each related to the subject matter of the icon 20/primary menu option selected on the icon wheel. For example, if the selected icon relates to the web (say as before by depicting a networked computer), the text labels for the submenu options might include "web search", "on-line news", "favourite websites" etc.

In the event that a user selects a different icon/primary menu option, for example, an icon depicting a television, the original group of text labels corresponding to the original submenu options in the windows 6-11 is removed and replaced by a new group of text labels corresponding to new submenu options relating to television, for example, "sports", "news", "documentaries", "favourite shows", "TV set-up" etc.

Figure 2:
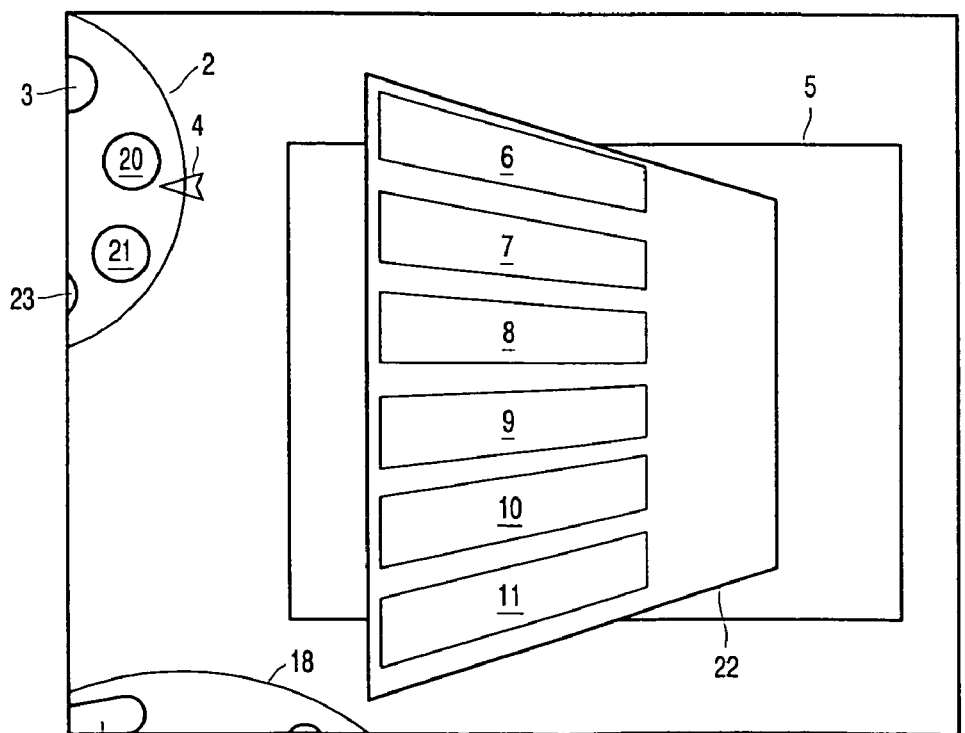
Figure 3:
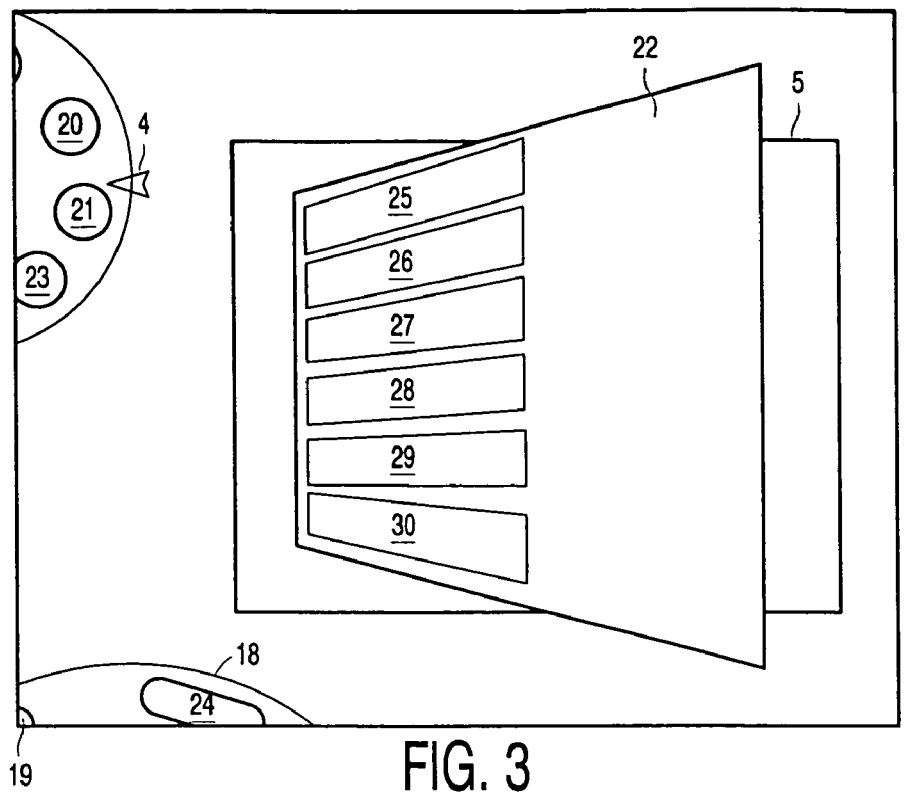
Figure 4:
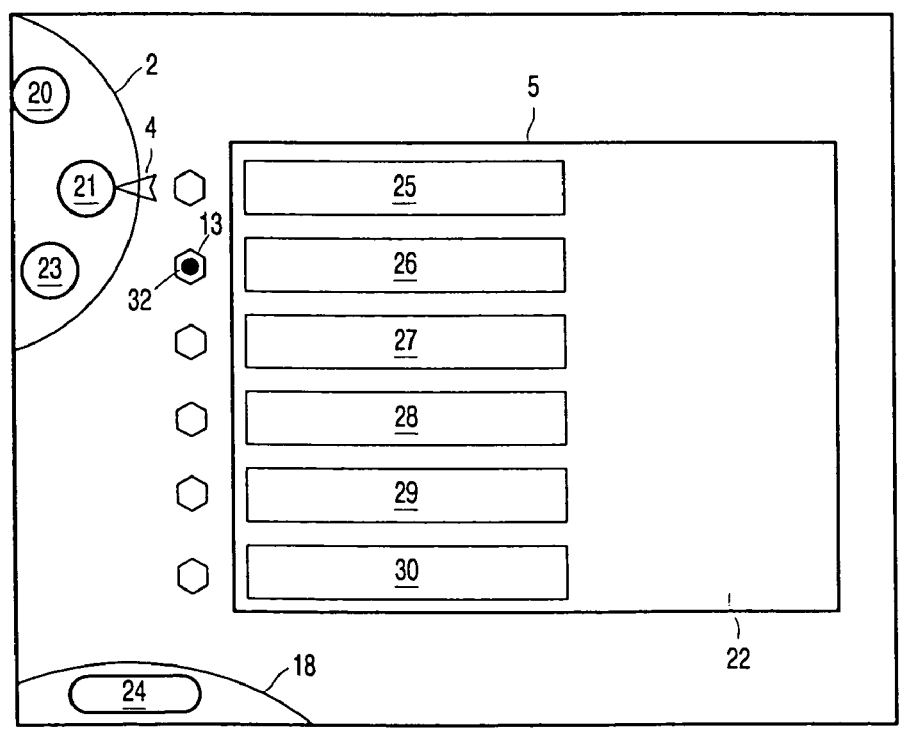

FIGS. 2 to 4 sequentially illustrate the changes in the menu display when a different icon/primary menu option is selected. The icons 3, 20, 21, 23 and the icon wheel 2 rotate during a user's new selection whereby the previously selected icon 20 moves away from the icon selector graphic 4 and is replaced by icon 21 corresponding to the newly selected primary menu option. As the view of the icon wheel is partial, icon 3 goes off the screen and icon 23 appears. Corresponding changes are made in the feedback wheel 18 in that old text label 19 is replaced by new text label 24 describing the newly selected icon/primary menu option.

In parallel, the window 22 rotates in the frame 5 about a vertical axis relative to the menu display 1 and in the plane of the menu display. The illusion of perspective during rotation is produced by shrinking the part of the window and its contents when "behind" the display and enlarging the part of the window and its contents when "in front" of the display and whereby both shrinking and enlargement are progressive relative to the perceived distance of the window and its contents from the display.

During rotation, the old group of text labels 6-11 which relate to the icon previously selected are removed from view and replaced by a new group of text labels 25-30 on the flip-side of the window 5.

The menu display may be manipulated by cursor keys on a keypad (not shown) wherein, in a first mode, up and down cursor keys are used to rotate the icon wheel 2 clockwise and anticlockwise respectively, and in a second mode, the same up and down cursor keys are used to position the identifier 32 on the required button. Switching between modes is accomplished by using left and right cursor keys; left to control the icon wheel and right to control the identifier. Alternatively, a toggle switch such as a single key may be used to toggle between first and second modes of operation.

Figure 5:
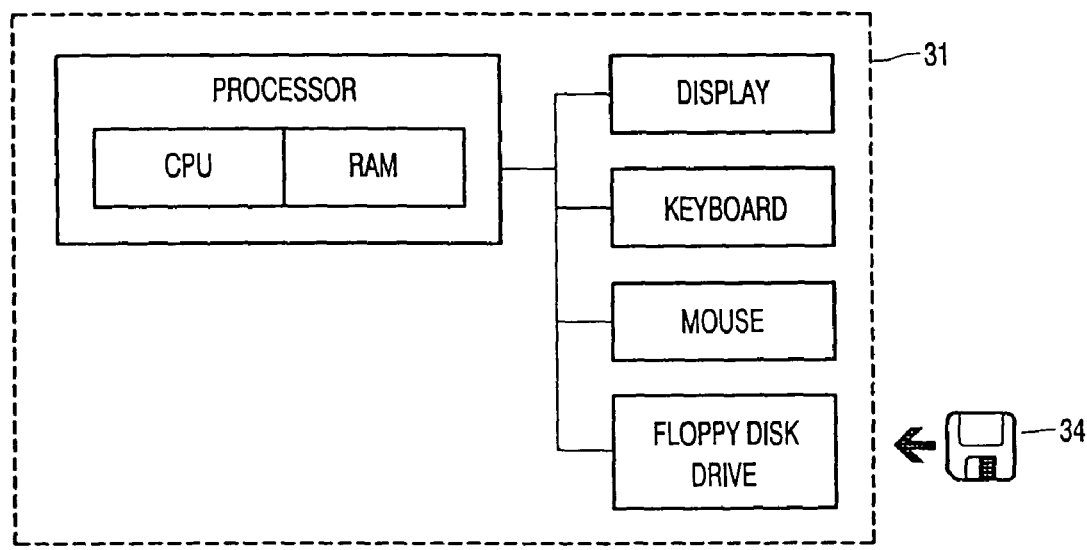
FIG. 5 shows, schematically, a computer system capable of implementing the menu display of FIGS. 1 to 4.

A computer system 31 capable of implementing the above method is shown schematically in FIG. 5. The computer system comprises a processor having a central processing unit (CPU) and a random access memory (RAM). The computer system further comprises a display, keyboard, mouse and a floppy disk drive, all coupled to the processor in known manner. A floppy disk 34 is provided for the floppy disk drive having recorded thereon a computer program comprising instructions for performing a method according to the present invention. Alternatively, other types of computer-readable storage media and corresponding hardware may be used.

Implementation of a method according to the present invention in such a computer system may be readily accomplished in hardware, in software by appropriate computer programming and configuration or through a combination of both. Of course, such programming and configuration is well known and would be accomplished by one of ordinary skill in the art without undue burden. It would further understood by one of ordinary skill in the art that the teaching of the present invention applies equally to other types of apparatus having a GUI and not only to the aforementioned computer system.

The invention claimed is:

1. A method of providing a menu display for a GUI comprising the steps of:
   displaying in a visually rotatable first portion of a screen a menu on the screen in the form of at least a subset of a group of icons, wherein each icon corresponds to a respective menu option among a plurality of menu options, and is selectable by a user;
   displaying an icon selector graphic on the screen that is adapted to identify which icon corresponding to a particular one of the menu options is currently selected by a user; and
   displaying in a visually rotatable second portion of the screen that is intersected by at least one edge of the screen such that only a textual label that describes the currently selected menu option is fully in view on the screen, wherein the textual label is from a group of textual labels; wherein
   the group of icons and the icon selector graphic are rotatable relative to each other and in accordance with an input by the user.

2. A method according to claim 1 wherein each of the textual labels describes a respective one of the plurality of menu options.

3. A method according to claim 1 wherein a center of rotation of the group of textual labels is located outside the screen.

4. A method according to claim 1 wherein the icon selector graphic is stationary and the group of icons is rotatable.

5. A method according to claim 4 wherein the group of icons is appended to a rotatable carrier that is rotatable in the plane of the screen.

6. A method according to claim 4 wherein a centre of rotation of the rotatable carrier to which the group of icons is appended is located outside the screen such that the rotatable carrier to which the group of icons is appended is intersected by at least one edge of the screen.

7. A method according to claim 4 wherein at least one of the icons for which the respective menu option is currently unselected is out of view at any given time.

8. A computer program comprising instructions for performing a method according to claim 1.

9. A computer-readable storage medium having recorded thereon a computer program according to claim 8.

10. Apparatus having a display, a processor and a user input device for providing a GUI menu display in accordance with claim 1.

11. A method according to claim 3, wherein:
    a different one of the textual labels is fully in view on the screen when a corresponding one of the plurality of menu options is selected by the user, while a remainder of the textual labels and a remainder of the rotatable textual label carrier is off the screen.

12. The method of claim 1, wherein:
    the displaying the menu on the screen in the form of the at least a subset of the group of icons comprises displaying a rotatable icon wheel on which the at least a subset of the group of icons is provided.

13. The method of claim 1, wherein:
    the displaying the menu on the screen in the form of the at least a subset of the group of icons comprises displaying a rotatable icon wheel on which only the subset of the group of icons is provided.

14. A method of providing a menu display for a GUI comprising the steps of:
    displaying a primary menu on a screen in the form of at least a subset of a group of icons, wherein each icon corresponds to a respective primary menu option among a plurality of available primary menu options and is selectable by a user;
    displaying an icon selector graphic on the screen that is adapted to identify the icon corresponding to a particular one of the primary menu options that is currently selected by a user;
    displaying, on the screen, a submenu associated with the currently selected primary menu option, wherein the submenu is displayed concurrently with the primary menu; and
    in the event of a new primary menu option being selected, rotating into view on the screen, concurrently with the primary menu, a new submenu associated with the new primary menu option;
    wherein the group of icons and the icon selector graphic are rotatable relative to each other in the plane of the screen, and in accordance an input by the user:
    wherein, in a first mode of operation, in order to select a primary menu option, the user is able to rotate the group of icons relative to the icon selector graphic in either direction using first selection means;

wherein the group of icons rotate about a center of rotation that is different than a center of rotation of the submenu and wherein, in a second mode of operation, the user is able to select a submenu option using the same first selection means in the same fashion.

15. A method according to claim 14 wherein the submenu options are located on a planar rotatable window that is surrounded by a frame; and wherein, in the event of a new primary menu option being selected, the window is rotated with respect to the frame, whereby the new submenu is revealed to be on the flip-side of the window.

16. A method according to claim 15 wherein, in the event of a new primary menu option being selected, the window is rotated 180° with respect to the frame to reveal the flip side thereof.

17. A method according to claim 14 whereby switching between the first and second modes of operation is accomplished by second selection means.

18. A method according to claim 17 wherein the first selection means comprises up and down cursor keys on a keypad, and the second selection means comprises left and right cursor keys on the keypad.

19. A method according to claim 17 wherein the second selection means comprises a toggle switch for toggling between the first and second modes of operation.

20. A method according to claim 14 wherein the icon selector graphic is stationary and the group of icons is rotatable.

21. A method according to claim 20 wherein the group of icons is appended to a rotatable carrier.

22. A method according to claim 20 wherein a centre of rotation of the group of icons is located outside the screen.

23. A method according to claim 20 wherein at least one currently unselected icon is out of view at any given time.

24. A method of providing a menu display for a GUI comprising the steps of:

displaying on a screen a menu in the form of at least a subset of a group of icons, the group of icons being rotatable about a center of rotation along a curve, at least a portion of which appears on the screen, wherein each icon corresponds to a respective menu option among a plurality of menu options, and is selectable by a user; and separately displaying on the screen, and in a portion of the screen, that is intersected by at least one edge of the screen such that only a textual label that describes the currently selected menu option is fully in view on the screen wherein the textual label from a group of textual labels.

25. A method according to claim 24 wherein the group of textual labels is appended to a rotatable textual label carrier.

26. A method according to claim 25 wherein a centre of rotation of the textual labels is located outside the screen such that the rotatable textual label carrier is intersected by at least one edge of the screen.

27. A method according to claim 24 wherein only one full textual label is in view on the screen at any one time.

28. The method of claim 24, wherein:

the group of textual labels is rotatable in correspondence with the rotation of the group of icons.

* * * * *